(12) United States Patent
Zachary (10) Patent No.: US 6,173,564 B1
(45) Date of Patent: Jan. 16, 2001

(54) APPARATUS FOR MONITORING WET COMPRESSION GAS TURBINE POWER AUGMENTATION-RELATED CASING DISTORTIONS

(75) Inventor: Richard E. Zachary, Clinton, LA (US)

(73) Assignee: The Dow Chemical Company, Midland, MI (US)

( * ) Notice: Under 35 U.S.C. 154(b), the term of this patent shall be extended for 0 days.

(21) Appl. No.: 09/255,553

(22) Filed: Feb. 22, 1999

(51) Int. Cl.[7] ............................... F02G 3/00; F02C 7/00
(52) U.S. Cl. ...................... 60/39.091; 60/39.33; 60/39.53
(58) Field of Search .............................. 60/39.33, 39.53, 60/39.091

(56) References Cited

U.S. PATENT DOCUMENTS

| | | | |
|---|---|---|---|
| 4,934,137 | * | 6/1990 | MacKay ............................. 60/39.33 |
| 5,026,154 | * | 6/1991 | Deason ............................... 356/35.5 |
| 5,365,787 | * | 11/1994 | Hernandez et al. ............ 324/207.25 |
| 5,982,478 | * | 11/1999 | Ainsworth et al. ..................... 356/28 |

* cited by examiner

Primary Examiner—Charles G. Freay

(57) ABSTRACT

An apparatus is provided for use in monitoring for destructive wet compression power augmentation-related casing distortions in an industrial gas turbine equipped with and employing wet compression power augmentation, in the form of a) an outer ring member having an inner diameter which exceeds the outer diameter of a gas turbine section downstream of the compressor, b) three or more structural members spaced substantially equally over the outer ring member's inner circumference and which extend radially inwardly in a common plane to define a central opening about the gas turbine, with the common plane defined by the three or more members being parallel to a plane including the outer ring member over its circumference and the outer ring member's center of mass and with one of the three inwardly-extending members being equipped at its inner end with a socket or ball element of a ball and socket joint, and c) a laser reflector positioned on the outer ring member.

5 Claims, 8 Drawing Sheets

APPARATUS FOR MONITORING WET COMPRESSION GAS TURBINE POWER AUGMENTATION-RELATED CASING DISTORTIONS

FIELD OF THE INVENTION

The present invention relates to power generation apparatus and especially to large, land-based gas turbines such as are employed in industry and by utilities for power generation purposes, and more particularly relates to the use of a power augmentation technology on such turbines as has been described in related, commonly-assigned and copending U.S. patent applications designated by Ser. No. 08/645,781 (filed May 14, 1996, now U.S. Pat. No. 5,930,990, Ser. No. 08/715,675 (filed Sept. 18, 1996, now U.S. Pat. No. 5,867,977) and Ser. No. 08/837,192 (filed Apr. 14, 1997), with the last such application substantially corresponding to an application filed under the Patent Cooperation Treaty as PCT/US97/08757 and published on Nov. 20, 1997 as WO 97/43530.

BACKGROUND OF THE INVENTION

As thoroughly discussed in the aforementioned, related applications, all of which are now incorporated herein by reference, one of the principal control (and potentially operations-limiting) issues associated with the referenced power augmentation technology—for present purposes, this technology will be termed "wet compression" power augmentation technology—is the issue of deformation of the gas turbine housing that can occur with an uneven distribution of an added vaporizable liquid (preferably being water) in the gas turbine and corresponding uneven thermal expansion/contraction effects on the turbine housing.

The concern with such deformation, of course, is that the degree of deformation will be large enough to cause a stall or a rub of compressor blades, for example, against the turbine housing, and to potentially cause a turbine wreck altogether.

In the incorporated applications, a laser monitoring system is described for monitoring the deformation effects and characteristics of subsequent nebulized water mass flow increments, as these are added by means of one or more racks of spray nozzles positioned upstream of the compressor inlet.

SUMMARY OF THE PRESENT INVENTION

The present invention represents a refinement or improvement of the monitoring system and process concepts described in the incorporated applications, however, in defining a thermal isolation ring for isolating those potentially destructive movements of a gas turbine housing that are associated with the use of wet compression power augmentation technology and more particularly, with an uneven distribution of water (or some other added high latent heat of vaporization liquid) in the gas turbine and corresponding uneven thermal expansion/contraction effects on the turbine housing, from any confounding deformations or movements of the turbine housing that may be observed but which are not indicative of a risk of a turbine rub or wreck.

In this regard, for example, it has been observed that in bringing wet compression power augmentation increments on-line in certain newer-design industrial gas turbines, the turbine housing will very often undergo a progressive (in the direction of mass flow through the turbine) circumferential expansion as additional mass flow increments are input to the turbine. Absent the thermal isolation ring refinement of the present invention, this expansion of the housing could well be misinterpreted as the sort of deformation that would threaten a compressor rub or potentially a turbine wreck, or could effectively mask an undesired deformation associated with an uneven delivery of liquid to the compressor.

BRIEF DESCRIPTION OF THE DRAWINGS

FIG. 3A is an enlarged view of details of the spray rack group assembly and steam pipes.

DETAILED DESCRIPTION OF THE PREFERRED EMBODIMENT

While the apparatus of the present invention is relatively simple in construction and principle of operation, it is probably best described by revisiting FIGS. 1 through 6 of the published PCT application, WO 97/43530, which application is incorporated herein by reference.

Defined Terms

The terminology employed in the published PCT application is adopted herein as well:

"Industrial gas turbine" means at least a 20 megawatt or a larger megawatt turbine used for land-based power generation in industrial and utility power-generating applications. The term industrial gas turbine can include heavy duty as well as aircraft derivative turbines.

"Heavy duty gas turbine" refers to a type of gas turbine which, from a design standpoint, is not specifically designed to accept abrupt changes of significant magnitude in power output. Heavy duty gas turbines are thus intended to be distinguished, particularly, from aircraft turbines.

"Working fluid". The typical working fluid of a gas turbine is a gas; the typical working fluid in the compressor of a gas turbine is humidified air. In the present invention the working fluid is expanded to include an added liquid (such as demineralized water) which is subsequently vaporized in the gas turbine thermodynamic cycle. The working fluid can change its composition as it progresses through the industrial gas turbine (due to injection of materials and from the combustion process). In this regard, the working fluid can, at various positions along the axis of the gas turbine as it progresses through the working cycle of the gas turbine, be either a gas mixture, a two-phase liquid in gas mixture, a two-phase mixture of solid particles in gas, or a three-phase mixture of liquid and solid particles in gas.

"Net output" is in reference to the net output of a gas turbine and means the available shaft power for driving a generator or process compressor (external to the gas turbine). Net output of a gas turbine is measured by torque and speed of the rotor shaft and can be expressed in terms of either horsepower or megawatts. When expressed in terms of megawatts, the term net output generally includes generator losses. When comparing net outputs under comparable conditions, but with and without a high latent heat of vaporization liquid being added, the comparable conditions include a comparable process for measuring net output.

"Addition of heat and humidity" references the concurrent addition of heat and moisture to the working fluid up to the saturation point of the working fluid.

"Angular deformation" refers to a condition of bowing or distortion of the housing which can result in interference between the rotor and housing of the turbine.

"Damage" means harmful alteration of any of the components of the gas turbine beyond that which would be anticipated in the course of reasonable use and operation. With the contemplated liquid addition to the compressor, a certain acceptable degree of erosion of the blade coating or blade material is anticipated.

"Water" means water which, in compositional nature, is useful for ingestion into the gas turbine for purposes of the present invention. It can include impurities and conventional or beneficial additives such as, for example, a freezing point depressant or materials to reduce or remedy any tendency of the water added to corrode turbine components or to leach out components of alloys used in constructing the various structural elements of the gas turbine with which the water may come into contact.

"Varying a number of mass flow increments in a balanced manner" refers to increments of water (or other liquid generally) added to the working fluid. The term "balanced manner" refers to an increment as having been qualified to not cause a distortion of the gas turbine housing which exceeds an acceptable angular distortion limit when the increment is implemented and further that the combined increments cannot produce unacceptable angular distortion in the housing after an increment(s) has either been added to or subtracted from the previous set of combined increments.

"Sufficiently uniform distribution" refers to a distribution of added liquid in the working fluid acquired by the compressor, which will in turn result in a distribution of liquid within the compressor that will not cause a distortion of the gas turbine housing exceeding an acceptable angular distortion limit.

"Power augmentation" or "augmentation", in the particular context of this refinement or improvement, refers to the use of latent heat intercooling in the manner and according to the teachings of the incorporated applications, irrespective however of whether the net output of the gas turbine employing the latent heat intercooling is increased or is maintained at a given level. Thus, "augmentation" in the context of this application refers both to an increase in the generation capacity of the turbine, as contemplated in the incorporated applications, and to the use of the latent heat intercooling and mass flow effects of the wet compression technology to maintain a desired level of power generation while reducing firing temperature and fuel consumption, for example. Provided distortion of the turbine's housing is a consideration, the apparatus of the present invention will be understood as applicable in both of these contexts.

Figure 1:
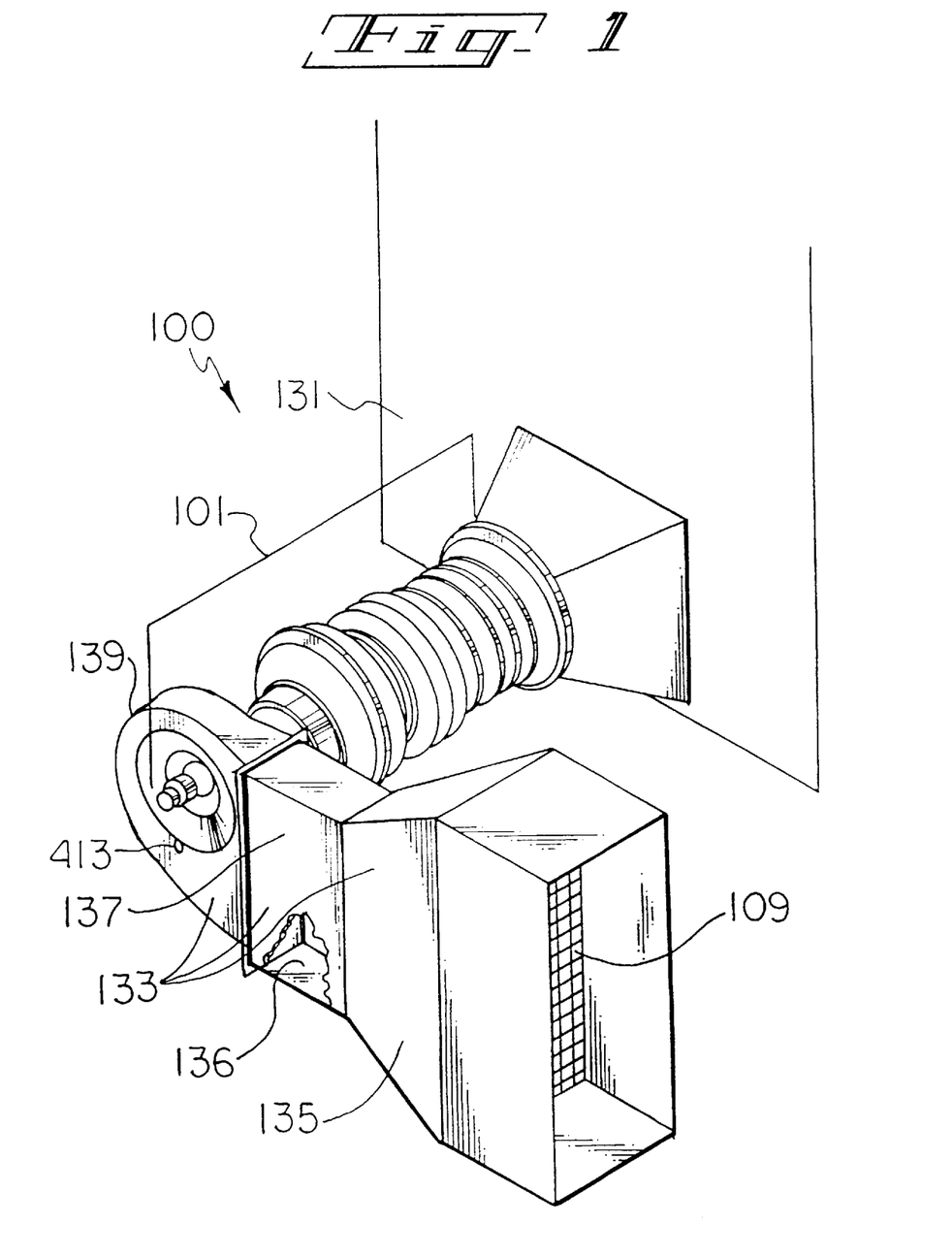
FIG. 1 shows an overview of a typical gas turbine power generation facility (the affiliated electric generator is not actually shown in FIG. 1, but is conventionally known) used to generate electric power from the combustion of fuel with air.

Turning now to FIG. 1, an overview is provided of a gas turbine power generation facility 100 used to generate electric power from the combustion of fuel with air and which is exemplary of a facility which may employ the apparatus of the present invention and of the prior, copending and published PCT applications (the affiliated electric generator is not actually shown in FIG. 1, but is presumed to be apparent). The gas turbine power generation facility 100 comprises a gas turbine or gas turbine engine 101 which includes an axial-flow compressor or axial compressor section 103, the axial compressor section 103 having a compressor inlet 102 for acquiring a working fluid comprising air.

An inlet air filter 109 is defined in an inlet air duct 133 preceding the compressor inlet 102 (see FIG. 2A), which inlet air filter 109 may be preceded (or followed in certain embodiments) by a conventional evaporative inlet air cooling apparatus (not shown). The inlet air duct 133 comprises an inlet air duct convergent portion 135, an inlet air duct constricted portion 137 (having a lower surface 136) and an inlet air duct manifold portion 139, the latter in this case having been equipped with a viewport 413.

Figure 2A:
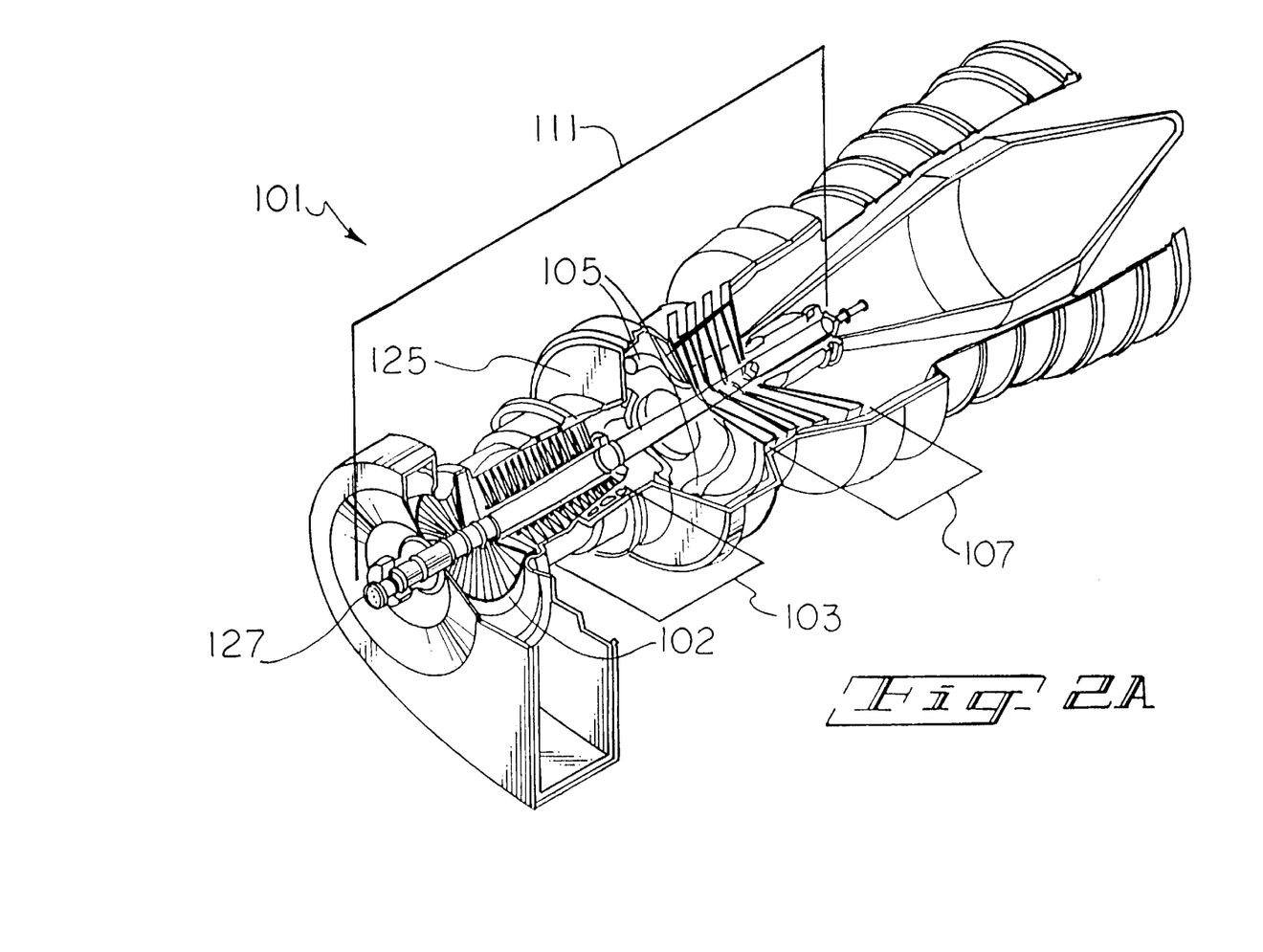
FIGS. 2A and 2B show details of a gas turbine engine having an axial compressor.
Figure 2B:
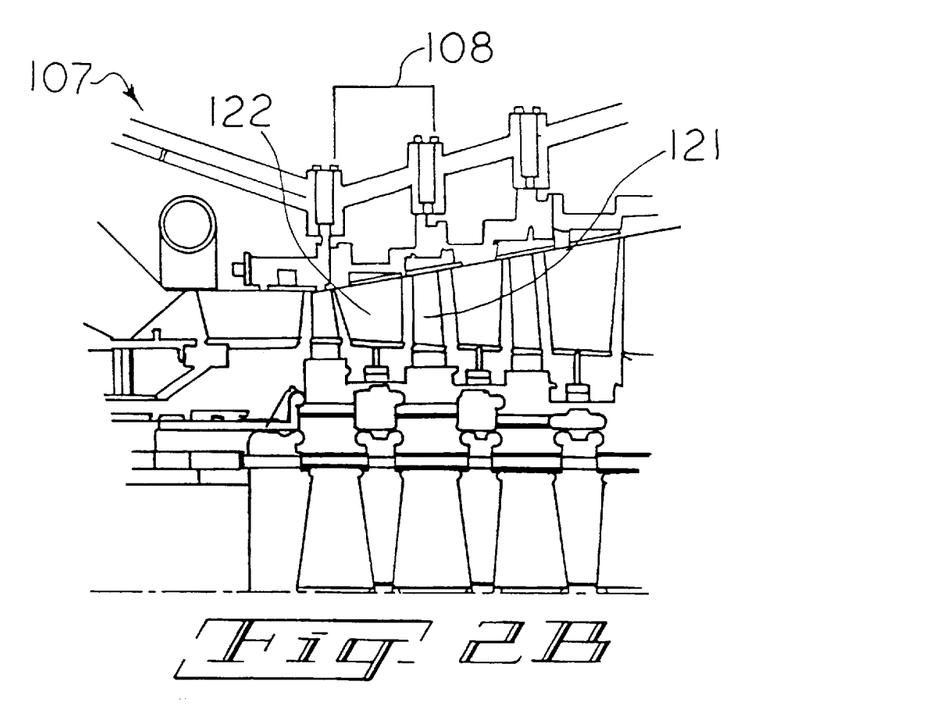

FIGS. 2A and 2B show further detail respecting gas turbine engine 101. After entering the compressor inlet 102, the air is compressed in the axial compressor section 103 by using a series of compressor stages 113. After compression, the compressed air then flows into combustion chambers 105 in the combustion section where it is mixed with fuel and the fuel is combusted to generate a hot pressurized gas for use in driving the turbine section 107. The turbine section 107 has a series of turbine section stages 108 which incrementally (1) convert the energy of the hot pressurized gas into work manifested as a rotating rotor 111 (preferably having coated components in the turbine section 107) and (2) generate an exhaust gas having a lower temperature and pressure than the hot pressurized gas which entered the respective turbine section stage 108. The exhaust gas from the first such turbine section stage 108 is then the hot pressurized gas for the second stage; the exhaust gas from the last stage is also the exhaust gas from the turbine section 107.

The rotor 111 is a part of both the turbine section 107 and the axial compressor section 103 and includes the rotor shaft 127 and the set of all rotor blades (115, 121) in both the turbine section 107 and the axial compressor section 103 mounted to rotor shaft 127. Rotor shaft 127 powers both the axial compressor section 103 and an electric generator or some other useful machine such as, without limitation, a large compressor used in chemical processing. In this regard, rotor shaft 127 is either a single structural component or, alternatively, a series of individual components which are mechanically attached together to form a virtual single structural component.

The various gases and fluids within the gas turbine engine 101 are generally contained by a housing 125 which defines an inner space of the gas turbine engine 101 to (a) channel the pre-compression air, (b) contain the compressed air in its progression through the sequential compressor stages 113, (c) provide a pressure shell to contain the compressor discharge around the combustion chamber(s) 105 in the combustion section, (d) contain the hot pressurized gas in which fuel has been combusted as it expands in the turbine section 107, and (e) channel exhaust gas while resident within the combustion engine 101. The housing 125 is usually constructed of several different pieces which are essentially connected together.

In axial compressor section 103, each compressor stage 113 is made up of a series of compressor rotor blades 115 mounted on the rotor shaft 127 and both the preceding and following sets of compressor stator blades 117 where, for each set, compressor stator blades 117 are mounted as a series in a radially disposed manner as a stationary blade row. The compressor stator blades 117 are (a) proximately fitted closely to the internal wall of housing 125 and (b) sealed to the rotor 111 in such a manner as to enable, in operation, an essential fluid isolation of one compressor stage 113 from its companion compressor stage(s) 113. The compressor rotor blades 115 and the compressor stator blades 117 collectively function to increase the pressure of air passing through compressor stage 113 by (1) transferring kinetic energy to the air (or gas flow) from the rotating compressor rotor blades 115 and (2) channeling the air flow, which results in a pressure and temperature rise in the air as the air is decelerated by the compressor stator blades 117 following the compressor rotor blades 115. The pressure ratio of exit pressure to inlet pressure in one compressor stage 113 is limited by intrinsic aerodynamic factors, so several compressor stages 113 are usually required to achieve a higher overall pressure ratio for the axial compressor section 103 than could be achieved by a single axial compressor stage 113.

After addition of fuel in the combustion chamber(s) 105 of the combustion section and oxidation of the fuel by the oxygen within the compressed air, the resultant hot pressurized gas is converted into work within turbine section 107; this process is achieved by transferring the high kinetic energy of the expanding hot pressurized gas to the turbine section rotor blades 121 in a series of turbine section stages 108.

Each turbine section stage 108 is made up of a series of turbine section rotor blades 121 mounted on the rotor shaft 127 and the preceding set of turbine section stator blades 122 which are mounted as a series in a radially disposed manner as a stationary blade row. The turbine section stator blades 122 are (a) proximately fitted closely to the interior wall of housing 125 and (b) sealed to the rotor 111 (usually with labyrinth seals) in such a manner as to enable, in operation, an essential fluid isolation of one turbine section stage 108 from its companion turbine section stage(s) 108. The turbine section rotor blades 121 and the turbine section stator blades 122 collectively function to incrementally decrease the pressure of the hot pressurized gas by (1) channeling the hot pressurized gas and (2) transferring kinetic energy from the expanding hot pressurized gas to the rotating turbine section rotor blades 121, producing work which is manifested in the rotation of the rotor 111 as it drives its load.

Figure 3:
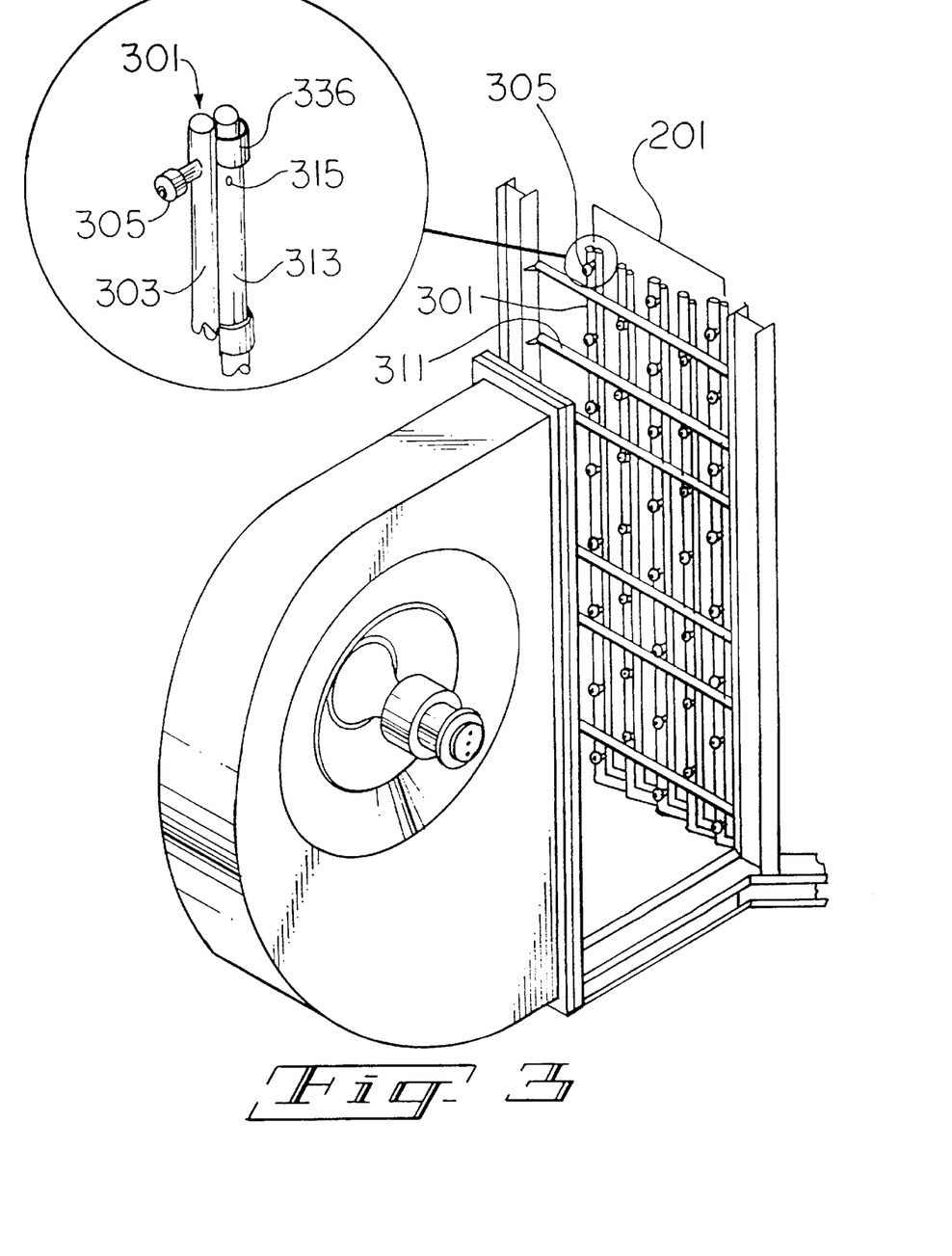
FIG. 3 shows the positioning of a spray rack group assembly used in the gas turbine power generation facility of FIG. 1. Affiliated steam pipes are also shown.

FIG. 3 now shows a means for providing vaporizable liquid particles to the working fluid acquired by the axial-flow compressor 103, and preferably thereafter, for controllably augmenting (and correspondingly, controllably reducing) the amount of liquid provided to the working fluid. As has been indicated previously, a preferred, high latent heat of vaporization liquid to be added is water, and the description hereafter while speaking most often of adding liquid water should be understood as contemplating and encompassing the addition of other vaporizable liquids.

A preferred apparatus for adding liquid water to the working fluid acquired by the axial compressor section 103 comprises a spray rack group assembly 201 communicating with the compressor inlet 102 of the axial compressor section 103. The spray rack group assembly 201 can be positioned anywhere between the inlet air filter 109 and the compressor inlet 102, but is preferably inserted into the inlet air duct 133 in the inlet air duct constricted portion 137 after the inlet air duct convergent portion 135. This positioning has benefits in that sufficient separation from the compressor inlet 102 is provided so that a nozzle 305 (or other damaged part of either a steam addition system to be described more particularly hereafter or of the spray rack group assembly 201) which might become detached from spray rack group assembly 201 will be gravitationally pulled to the lower surface 136 of inlet air duct 133 before the nozzle 305 (or damaged part) is pulled into the rotating rotor 111.

The spray rack group assembly is made up of a group of individual spray racks 301, where each individual spray rack 301 is made up in turn of a spray rack water pipe 303 with a group of spaced spray rack water nozzles 305 for nebulizing the water which is sent through the spray rack water pipe 303. Additionally, a spray rack steam pipe 313 with spray rack steam hole(s) 315 can in an optional further refinement be further provided to add steam heating to the inlet air. Mounting sleeve(s) 336 are periodically employed on each spray rack steam pipe 313 to provide free movement during thermally induced expansion and contraction of the spray rack steam pipe 313.

Preferably very clean water, for example, water having a conductance of 0.4 micromhos or less with no particulates, whether as condensate water or distilled, deionized water, is in this manner nebulized (or atomized) to form a preferably very fine spray or fog of water. A number of known, commercially-available nozzle designs could be employed for providing this very fine water spray, for example, nozzles sold commercially by Rochem Technical Services, Ltd. as of the filing date of the prior, copending applications under the "FYREWASH" identifier (such entity having an office at 610 N. Milby Street, Suite 100, Houston, Tex. 77003), a 1-7N-316SS12 nozzle from Spraying Systems Co. (P.O. Box 7900, Wheaton, Ill., 60189) which provides a spray characterized by a volume mean diameter of 153 microns (2 gallon per minute (7.6 litres per minute) flow rate) at a pressure drop of 80 psig (550 kPa, gauge) and a temperature in the range of 45 to 165 degrees Fahrenheit (7.2 degrees Celsius to 73.9 degrees Celsius), or a 1-7N-316SS16 nozzle from Spraying Systems Co. which provides a spray characterized by a volume mean diameter of 188 microns (2.6 gallon per minute (9.9 litres per minute) flow rate) at a pressure drop of 80 psig (550 kPa, gauge)and a temperature in the range of 45 to 165 degrees Fahrenheit (7.2 degrees to 73.9 degrees Celsius).

Another, preferred nozzle type is a "spiral nozzle" such as sold by BETE Fog Nozzle, Inc., Greenfield, Mass., being essentially characterized by the use of a helical spray vane extending from the valve body outlet and having a continuously decreasing diameter in the direction of flow, for shearing the liquid to be atomized into the desired droplet size. Nozzles of this variety were initially shown in U.S. Pat. No. 2,612,407 and U.S. Pat. No. Re. 23,413, both to Bete. In terms of the present invention, known and/or generally available specimens of these types of nozzles have a number of desirable attributes, including being of a simple, rugged unitary construction with no separate parts that could be dislodged and potentially discharged into the compressor inlet, providing little to no internal restriction to flow through the valve body and having the capacity to produce a fine droplet size at reasonable flow rates and relatively lower pressures.

In this last respect, preferably the liquid supplied to the compressor inlet will be a substantially uniformly distributed mist or fine spray of particles having a mean average droplet diameter of less than about 200 microns, preferably being less than about 120 microns in mean average droplet diameter, more preferably being less than about 70 microns in diameter and especially being in the range of about 50 down to about 40 microns and less. Smaller particles more readily follow the velocity vectors established by fluid flow to the compressor, but will obviously entail additional expense through higher pressures and additional nozzles for a desired flowrate of liquid into the compressor.

As contemplated in the prior copending applications, the amounts of liquid water to be supplied through the spray rack assembly 201 will preferably be added or removed in a controlled fashion and in a balanced manner, with a sufficiently uniform distribution of the added liquid water in the working fluid taken into the compressor so as to avoid undue distortion of the turbine housing because of uneven cooling effects on the housing associated with the liquid water addition.

This controlled augmentation can entail a smooth ramping-up of the liquid water provided to the working fluid acquired by the compressor 103, such as by increasing the water pressure to the spray rack assembly 201 or some portion of the assembly 201. In the alternative, the liquid water can be provided to the working fluid acquired by the compressor section 103 in a stepped, incremental fashion. As another alternative, a combination of smooth ramping and/or stepped modification of the amount of water provided to the working fluid acquired by the axial compressor section 103 can be beneficially employed either in a concurrent fashion or sequentially.

Most preferably, however, the liquid water, when either increasing or decreasing its flow, will be added or reduced in a stepped and balanced manner using a plurality of water mass flow increments. In this regard, those skilled in the art will appreciate that each nozzle 305 will have a range of pressures over which a particular liquid can be properly nebulized given an adequate supply of the liquid being nebulized, and that the nozzles 305 themselves may accordingly be viewed as individually essentially defining an increment of water addition; the smallest increment of water mass flow may then be the increment of water mass flow needed to activate the smallest nozzle 305 which might be deployed in facilitating wet compression.

Preferably, however, the increments of water mass flow will be defined at the level of individual spray racks 301 by controlling the pressure to a spray rack water pipe 303, whereby the group of spray rack water nozzles 305 connected to that spray rack water pipe 303 will operate to process a general increment of water mass flow equal to the sum of the individual spray rack water nozzle 305 mass flow increments.

In an alternative embodiment, each individual spray rack water nozzle 305 may be separately valved and controlled to provide a maximum number of controllable water mass flow increments, with each increment being the essentially predictable and constant flow where the spray rack water nozzle 305 will deliver its functionally suitable spray pattern at the pressure drop available. U.S. Pat. No. 5,853,129 to Spitz in this regard describes valves of the "spiral type" described above, as modified to include a manually, pneumatically or electrically actuated flow restriction for reducing the discharge flow rate to the helical spray vane while maintaining the velocity of the liquid sprayed therefrom, and thereby maintaining the desired fine spray characteristics from the nozzle.

In yet another embodiment, a group of spray rack water pipes 303, each having an associated spray rack water nozzle 305 set controlled at the spray rack water pipe 303 level, may be mixed with other spray rack water nozzles 305 which are individually controlled.

It should be apparent from the above that a number of different arrangements of nozzles and pipes can be employed to provide liquid water to the working fluid acquired by the axial compressor 103, and in a more particular context to provide a mass flow of nebulized water to the working fluid in a plurality of nebulized water mass flow increments. In some cases also, the spray rack water nozzles 305 may be selected to be of different sizes and arranged to provide either pre-defined spray concentration profiles from a particular spray rack water pipe 303, or to facilitate passage and flushing of particulates from within a particular spray rack water pipe 303 to avoid clogging of subsequent spray rack water nozzles 305 carried on the pipe 303, as by employing a larger throughput nozzle 305 with larger internal clearances upstream of smaller throughput nozzles 305 on a given spray pipe 303.

The essential consideration in providing for the controlled addition or removal of water mass flow from the apparatus of FIG. 3, is that the mass flow of liquid water therefrom should be modified over time and with respect to position (or area of liquid water addition leading to the compressor inlet 102) so as to moderate thermal stresses imposed on the gas turbine 101 and the rate of change of thermal expansion and thermal contraction related to the addition of liquid water to the working fluid, and maintain angular distortion or deformation of the housing to within predetermined acceptable limits.

The addition of the liquid water in the form of a plurality of nebulized mass flow increments, as noted in the prior copending United States and Patent Cooperation Treaty applications, is particularly suited to the measurement and control of water addition-related deformation of the housing 125, based on the amount of deformation previously measured as a function of the addition of each of the increments and the response of the housing 125 to the addition or removal of various increments over time, or with respect to position in relation to the compressor inlet 102 and to other increments. For example, as each mass flow increment is activated, any incremental increase or reduction in the housing's deformation associated with the addition (or removal) of that increment can be measured. Once the system is qualified on a turbine for the addition of a certain mass flow rate of liquid water and with regard to a particular inlet configuration, it is expected that the water-addition system so qualified can then be confidently operated to control deformation within a generally predetermined acceptable limit even though measurements are no longer made (for example, the measuring system may be removed). In this regard, the measuring system is most advantageously used for design and commissioning purposes and may or may not be required to be used as a permanent part of the turbine power generation facility 100 after the angular deformation of the housing 125 is adequately defined with respect to a specific spray rack group assembly 201 and nozzle 305 design. Those skilled in the art will appreciate that mathematical modeling of the addition of various increments of nebulized liquid water to the working fluid may also be used to advantage for this purpose.

Figure 4:
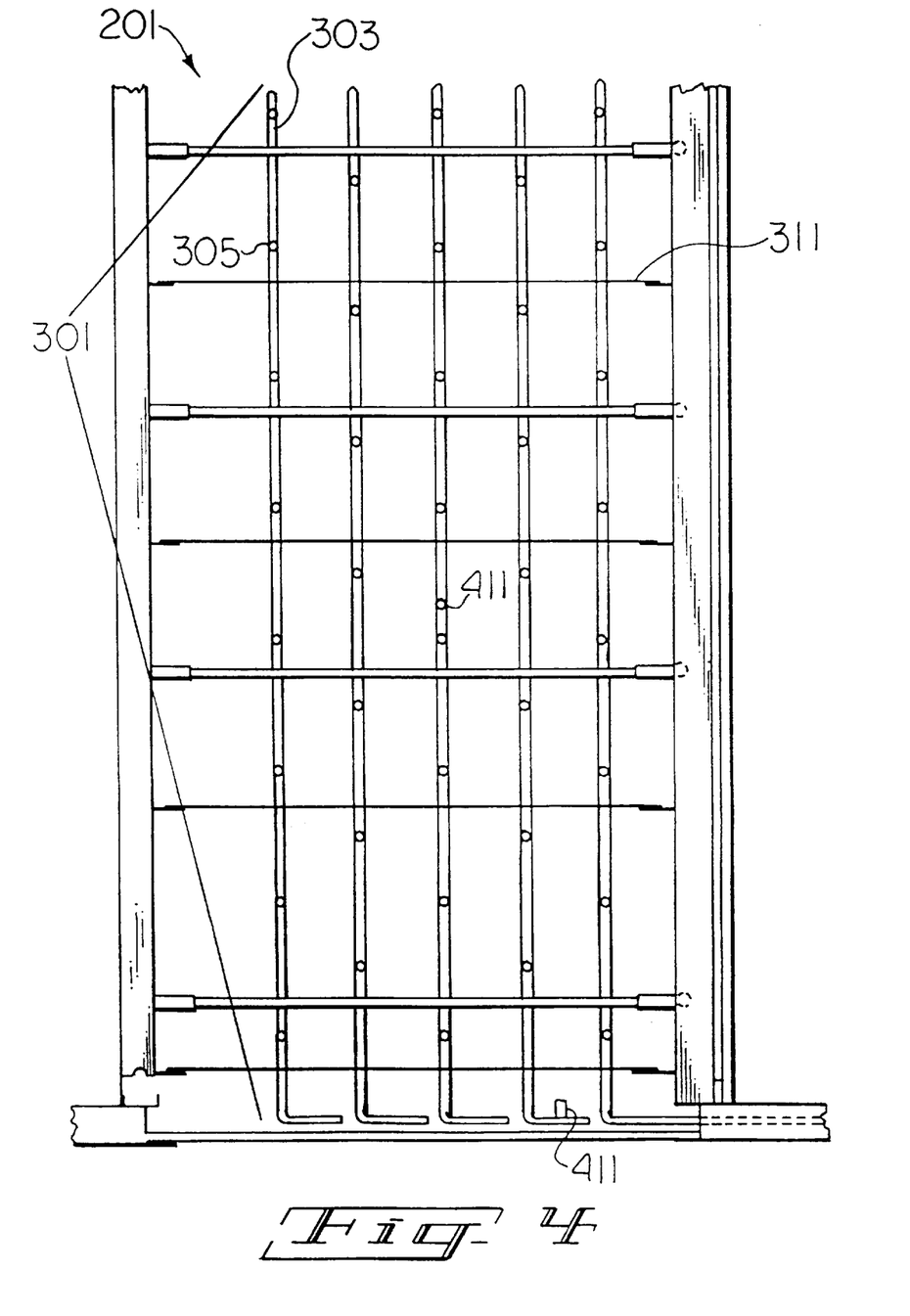
FIG. 4 shows further details for the layout of the spray rack, showing an elevation view of the relative location of individual spray rack water pipes, the positioning of each spray rack water nozzle, and the use of spray rack stiffeners.

FIG. 4 shows further details for the layout of the spray rack group assembly 201 shown in FIG. 3, showing, in an elevation view, the relative location of individual spray racks 301, the positioning of each spray rack water nozzle 305, and the use of spray rack stiffeners 311. In this regard, the dimensions and connections for spray rack stiffeners 311 are confirmed empirically to define a stable system which will be structurally robust. A system which can also be used as desired to monitor the spray rack group assembly 201 for overall integrity during operation is a spray rack vibration monitor 411, for detecting unacceptable resonance in the assembly 201.

Figure 5:
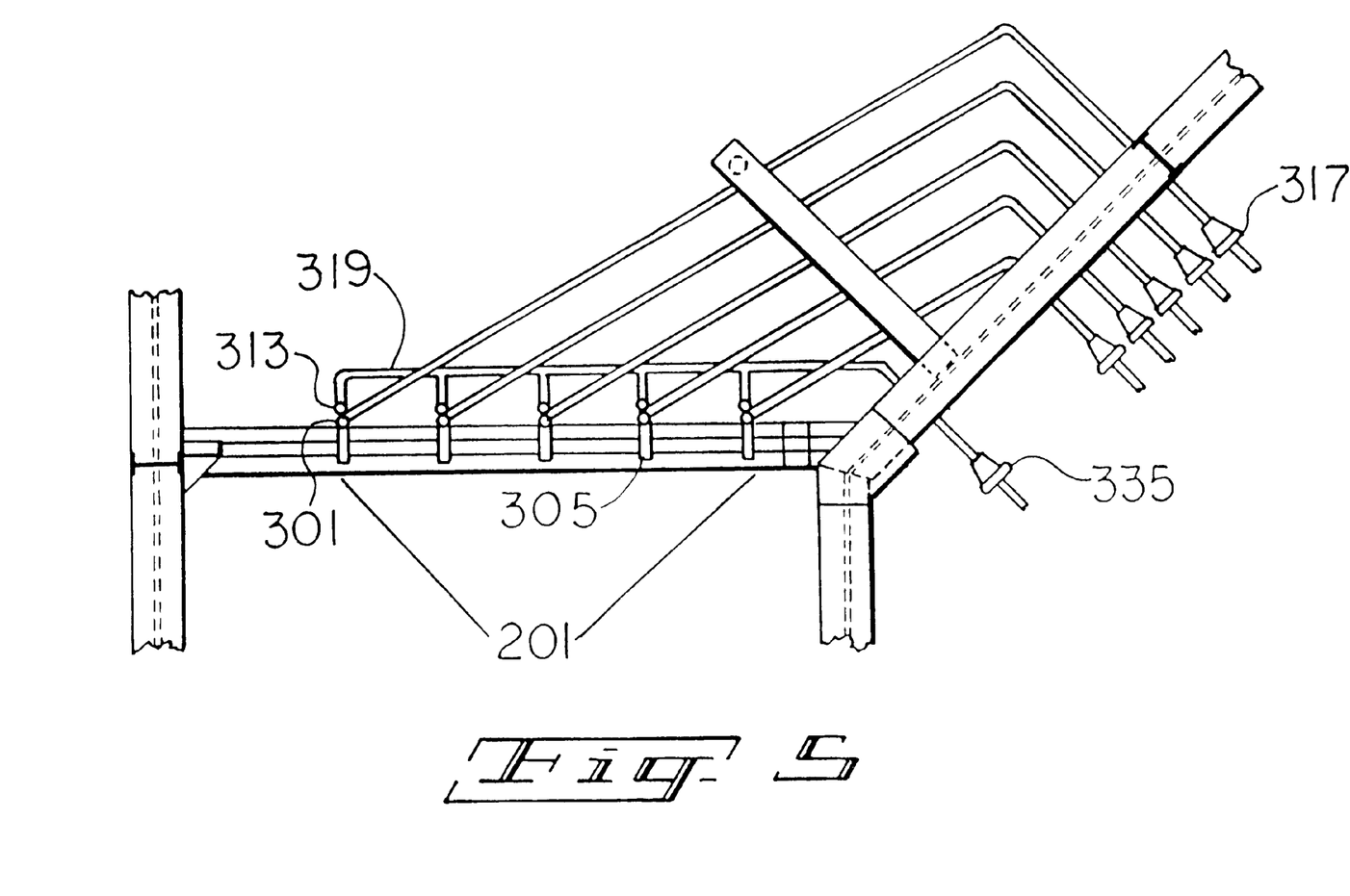
FIG. 5 is a plan view showing details of the spray rack assembly of FIGS. 3 and 4 with a steam manifold for feeding steam to the steam pipes.

FIG. 5 shows plan view assembly details of the spray rack assembly of FIGS. 3 and 4 and illustrates a preferred manner of adding both heat and humidity to the working fluid in an optional further refinement, to allow continued operation of the spray rack assembly 201 during periods when the temperature of the working fluid would otherwise drop to a level which would allow detrimental ice formation in the inlet. The preferred method involves providing steam to the inlet 102, as for example where steam is added to the spray rack steam pipes 313 via steam manifold 319. The steam is added in the embodiment of FIGS. 3, 4, and 5 to provide steam sufficient to achieve a temperature in the inlet air which is above a point where water in the air freezes in the compressor inlet 102. At least one steam hole 315 is used for each spray rack steam pipe 313, although a preferred construction is that several steam holes 315 are provided for each spray nozzle 305; these steam holes 315 are equally dispersed along each steam pipe 313 for enabling a correspondingly substantially uniform and balanced addition of heat and humidity to the working fluid as is desired for the liquid water addition. Generally, it is expected that the compressor inlet 102 will be most susceptible to icing due to cooler inlet air proceeding along or being channeled along the walls of the housing 125 in the vicinity of the compressor inlet 102, and so preferably sufficient steam will in all embodiments be provided by means of the pipes 313 or by other, supplemental means at the periphery of the inlet air duct constricted portion 137, to prevent icing from occurring in this manner.

In order to further assure that the gas turbine engine 101 is not adversely affected by any inrush of liquid which will result if any spray rack water nozzle 305 should become detached from its spray rack water pipe 303, a restricting orifice 317 or other suitable flow restricting means (which is sized to limit the throughput of water in the respective spray rack water pipe 303) is preferably inserted into the source feed line for the spray rack water pipe 303. A steam flow restricting orifice 335 can also be used to restrict the amount of steam added in case of any breakage in the steam delivery system.

Whether steam addition is employed or not, it is important to manage the inlet air temperature at the compressor inlet 102 to prevent the water added and essentially entrained in the inlet air from freezing on surfaces in the vicinity of the inlet guide vanes of the compressor. Ice may starve the compressor into surge or may break free and encounter the rotating blades 115 in the axial compressor section 103.

The temperature of the working fluid in the compressor inlet 102 is in this regard preferably monitored with at least one temperature sensor (not shown) to help identify the proper amount of steam that needs to be added to the inlet air; in the case of essentially pure water, the inlet air temperature should generally be maintained above about 45 degrees Fahrenheit (although the appropriate minimum may vary somewhat from one turbine design to the next depending upon specific vendor inlet velocity designs) to assure that icing will not be induced by adiabatic expansion in the compressor inlet 102.

In the absence of the heating provided, for example, through the addition of the steam via steam holes 315 or by other means, it will be appreciated that this temperature limit effectively places an ambient temperature constraint on gas turbines employing the wet compression technology of the prior copending applications with pure water addition. However, the heating provided through the optional steam addition (generated in an added heat recovery unit 131 for a gas turbine power generation facility 100 operating in simple cycle or from low-pressure steam available in a facility operating in combined cycle) promises to enable utilization of the technology in the context of the present invention, at considerably lower ambient temperatures.

An additional safeguard against potentially destructive icing occurring at the compressor inlet 102 can be provided by placing at least one viewport 413 in the wall of the inlet air duct manifold portion 139 which enables viewing and scanning for ice buildup by an operating technician. If such a viewport 413 is used, the use of a video camera (not shown) can further simplify the information gathering process by enabling an operating technician to have a convenient visual of the interior of the inlet air duct 133 and/or compressor inlet 102 on a video screen monitor. In this regard, the water mass flow may need to be reduced or interrupted to facilitate a full visual examination of that part of the interior of inlet air duct 133 and/or compressor inlet 102 which can be viewed from viewport 413. An optional and more conventional further anti-icing enhancement to the system providing water to spray rack group assembly 201 is to also mix a material into the water stream which depresses the freezing point of the water particles. In this regard, freezing point depressants (for example, alcohols such as methanol) can be used to provide for a lower working temperature in the inlet air and for operation of the system at lower ambient air temperatures, in lieu of or in addition to the use of steam addition for the same purpose.

Figure 6:
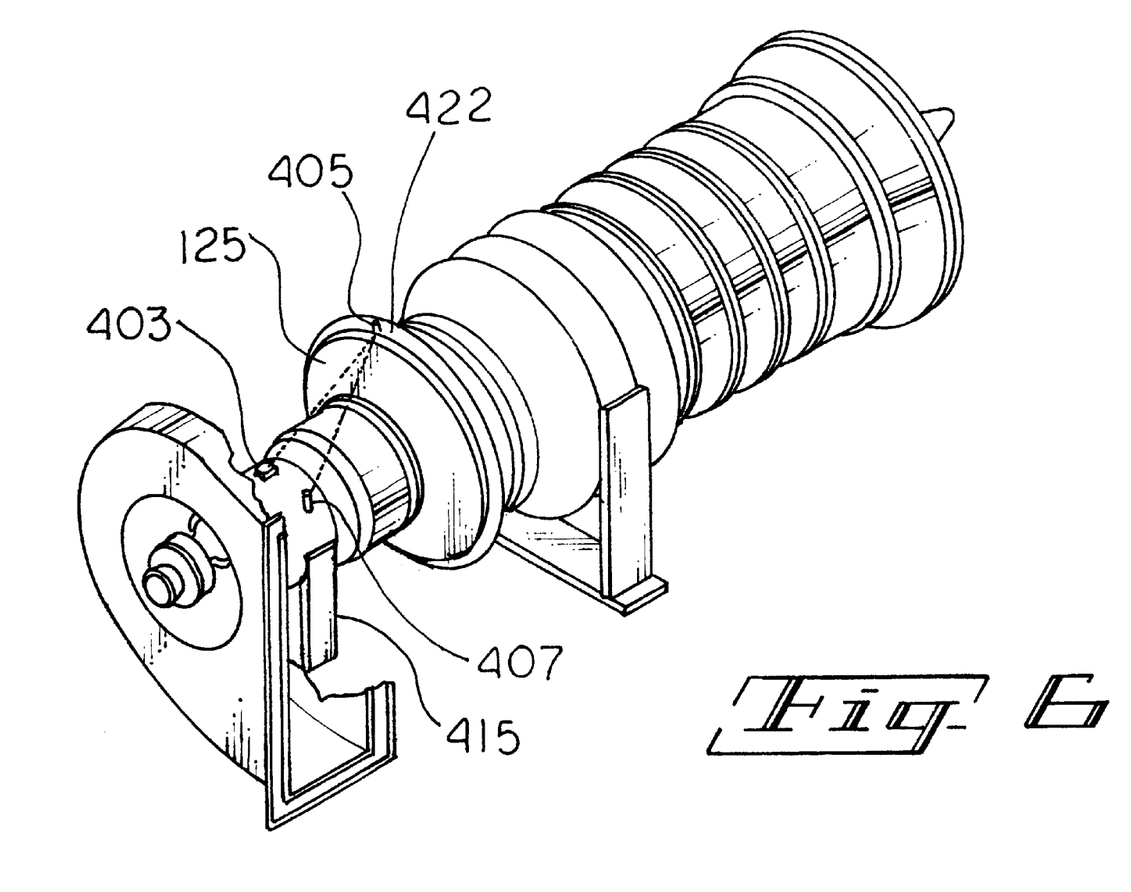
FIG. 6 presents details of the apparatus described in the prior, copending applications for monitoring for deformation of the housing of the gas turbine engine system shown, for example, in FIGS. 1 and 2.

FIG. 6 presents details for one means for monitoring liquid water addition-related deformation of the housing 125 of the gas turbine engine 101, as taught in our prior copending and published PCT applications. FIG. 6 shows the use of a laser emitter 403, a laser reflector 405 and a laser target 407 to achieve monitoring of distortion in the housing 125. In the embodiment of FIG. 6, all of the components are mounted on the housing 125 or on other parts of the turbine 101 itself.

Figure 7:
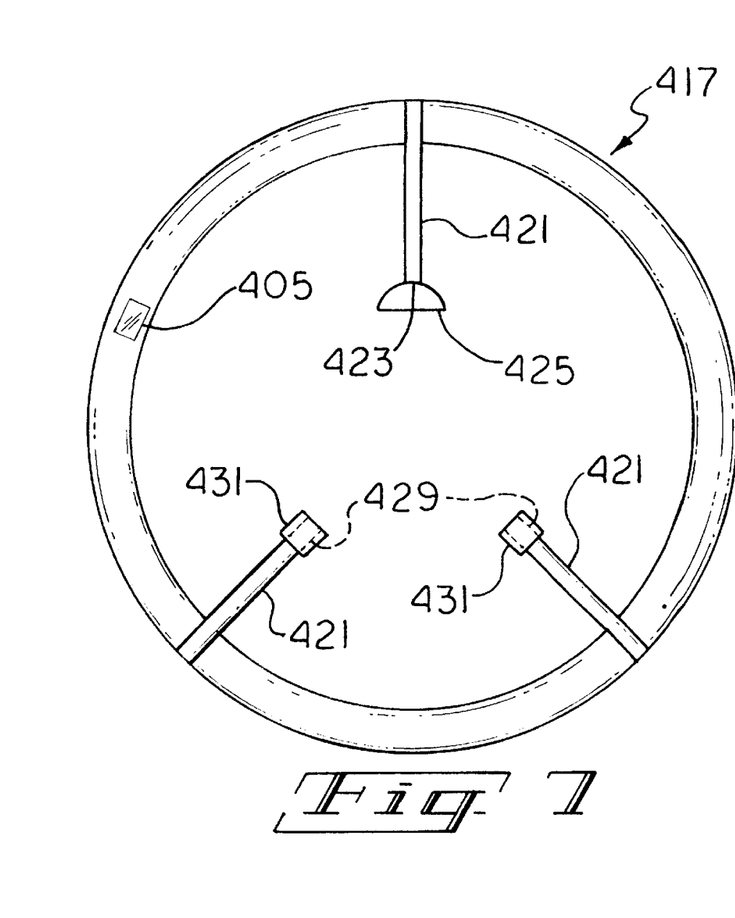
FIGS. 7 and 8 depict a preferred example of a thermal isolation ring employed according to the present invention both in isolation and in schematic relationship to the gas turbine.
Figure 8:
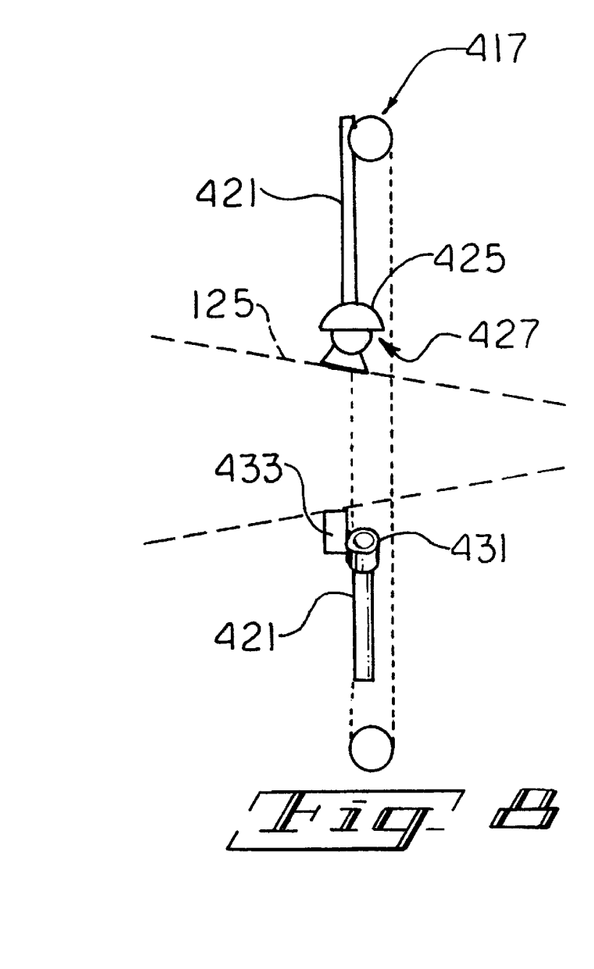

The more preferred apparatus of the present invention is now shown in one preferred embodiment in FIGS. 7 and 8, wherein the laser emitter 403 and a position sensitive laser target 407 are affixed to a stationary portion of the turbine on or near an inlet bearing 415 of the turbine (see FIG. 6), and an outer ring member 417 is provided.

Three or more members 421 are spaced substantially equally over the ring member 417's inner circumference and extend radially inward, defining a central opening which is large enough to accommodate the outer ring's placement about the gas turbine housing 125 and in position to indicate wet compression-related deformation of the housing 125. A preferred placement in this regard will have the outer ring member 417 mounted about the end of the compressor case or on the combustor shell 422. The topmost of the inwardly-extending members 421 is equipped at its inner end 423 with a socket element 425 of a ball and joint socket 427, the corresponding ball element 427 being defined atop the housing 125. The remaining inwardly-extending members 421 are equipped at their respective inner ends 429 with low friction contact components 431 (for example, transversely disposed roller bearings or self-lubricating high temperature bronze sleeves—the latter being shown for purposes of illustration in FIGS. 7 and 8), for being biased into contact with, and moving over, flat receiving surfaces 433 defined on the turbine housing 125 and which are perpendicular to the longitudinal axis of the turbine 101.

The three or more members 421 together define a common plane which is offset from the center of mass of the ring member 417, so that the weight of the ring member 417 is supported on the ball element 427 and the low friction contact components 431 are biased by virtue of the offset relationship of the three members 421 to the center of mass of the ring member 417 and by a compensating movement of the socket element 425 on the ball element 427 into contact with the flat receiving surfaces 433. Finally, a laser reflector 405 is positioned on the outer ring member 417, and as the low friction contact members 431 are biased into contact with the flat receiving surfaces, the reflector 405 defines a line of sight with the laser emitter 403 and with the position sensitive laser target 407.

This arrangement on the whole, it will be appreciated, allows for some movement and expansion of the housing 125 which are unrelated to the unequal provision of liquid water to the working fluid acquired by the compressor of the turbine, while maintaining a perpendicular reference plane to the longitudinal axis of the turbine (the beam from laser emitter 403 should be projected parallel to the center line of the rotor) and enabling the detection of wet compression-related distortions of the turbine housing 125, as distinct from these unrelated movements which may occur especially in larger, newer turbines with more flexible or thinner housings 125.

What is claimed is:

1. An apparatus for use in monitoring for destructive wet compression power augmentation-related casing distortions in an industrial gas turbine equipped with and employing wet compression power augmentation, comprising:

an outer ring member having an inner diameter which exceeds the outer diameter of a gas turbine section downstream of the compressor;

three or more members spaced substantially equally over the ring member's inner circumference and which extend inwardly along respective radii of the ring member but define a central opening not intersected by any of the three members and which also is larger in diameter than the gas turbine section, the three members together defining a common plane, said common plane being parallel to a plane including the outer ring member over its circumference and the center of mass of said outer ring member, and wherein one of the three inwardly-extending members is equipped at its inner end with a ball or socket element of a ball and socket joint; and a laser reflector positioned on the outer ring member.

2. An apparatus as defined in claim 1, wherein at least two of the other inwardly-extending members are equipped at their inner ends with low friction contact components.

3. A wet compression-equipped gas turbine apparatus, having a destructive distortion monitoring apparatus as defined in claim 2, which comprises:

a gas turbine which is equipped with an arrangement of spray nozzles for providing a power-augmenting amount of nebulized liquid water to the working fluid acquired by the compressor section of the turbine;

a laser and position sensitive sensor affixed to a stationary portion of the turbine on or near an inlet bearing of the turbine; and the destructive distortion monitoring apparatus, wherein the destructive distortion monitoring apparatus is positioned about a section of the combustion turbine downstream of the compressor inlet, with the inwardly-extending member having the ball or socket element at its inner end being positioned atop the turbine and supporting the weight of the destructive distortion monitoring apparatus on a corresponding socket or ball element defined on the turbine casing, and with the low friction contact components on the respective inner ends of the at least two other inwardly-extending members being biased into contact with corresponding flat receiving surfaces defined on the turbine casing and which are perpendicular to the longitudinal axis of the turbine, the laser reflector on the outer ring member defining a line of sight with the laser for monitoring for destructive wet compression power augmentation-related movement of the turbine casing.

4. An apparatus as defined in claim 3, wherein the destructive distortion monitoring apparatus is positioned at or near the end of the compressor shell portion of the turbine casing or on the combustor shell portion of the turbine casing.

5. An apparatus as defined in claim 3, wherein the flat receiving surfaces are provided on machined plates mounted on a portion of the turbine casing, and whose position with respect to the casing can be adjusted as needed for maintaining contact with the low friction contact components at the inner ends of the at least two other inwardly-extending members.

* * * * *